United States Patent
Jordan et al.

(10) Patent No.: US 10,880,619 B2
(45) Date of Patent: Dec. 29, 2020

(54) VERIFYING PROVENANCE OF DIGITAL CONTENT

(71) Applicant: Raytheon BBN Technologies Corp., Cambridge, MA (US)

(72) Inventors: Alex Benjamin Jordan, Chelmsford, MA (US); John-Francis Mergen, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 16/281,949

(22) Filed: Feb. 21, 2019

(65) Prior Publication Data
US 2020/0275166 A1    Aug. 27, 2020

(51) Int. Cl.
*H04N 9/80* (2006.01)
*H04N 21/835* (2011.01)
*G11B 27/031* (2006.01)

(52) U.S. Cl.
CPC ......... *H04N 21/835* (2013.01); *G11B 27/031* (2013.01)

(58) Field of Classification Search
CPC ..... H04N 21/835; G06F 16/73; G11B 27/031; G11B 27/34; H04L 9/0643
USPC ....................................................... 386/241
See application file for complete search history.

(56) References Cited

U.S. PATENT DOCUMENTS

| 5,946,396 | A | 8/1999 | Davis |
| 2004/0117358 | A1* | 6/2004 | von Kaenel ........... G06Q 40/08 |
| 2005/0097361 | A1 | 5/2005 | Apostolopoulos et al. |
| 2005/0165840 | A1* | 7/2005 | Pratt .................... G11B 27/034 |
| 2010/0205162 | A1 | 8/2010 | Davis |
| 2018/0096175 | A1* | 4/2018 | Schmeling ............. G06Q 10/08 |
| 2018/0173719 | A1 | 6/2018 | Bastide et al. |
| 2018/0349706 | A1 | 12/2018 | Hodgson et al. |
| 2019/0034235 | A1* | 1/2019 | Yang .................... G06F 21/604 |

(Continued)

FOREIGN PATENT DOCUMENTS

WO    WO-2018032995 A1    2/2018

OTHER PUBLICATIONS

"International Application Serial No. PCT/US2020/018581, International Search Report dated Apr. 20, 2020", 5 pgs.

(Continued)

*Primary Examiner* — Helen Shibru
(74) *Attorney, Agent, or Firm* — Schwegman Lundberg & Woessner, P.A.

(57) ABSTRACT

Embodiments regard determining provenance of digital content. A method of determining the provenance of digital content can include receiving, at processing circuitry, edited digital content and data indicating an entity that edited source digital content to generate the edited digital content, the source digital content, and a destination of the edited digital content, generating, by the processing circuitry, additional data detailing an edit history of the edited digital content, the additional data indicating the entity, an edit identification uniquely identifying the additional data in a ledger, the source digital content, and the destination of the edited digital content, and generating a request to cause the additional data to be stored in the ledger, the ledger operable to be queried so that a user can determine an authenticity of the edited digital content based on the additional data of an edit chain returned in response to a query.

18 Claims, 5 Drawing Sheets

(56) References Cited

U.S. PATENT DOCUMENTS

2019/0182033 A1    6/2019  Li et al.
2019/0391972 A1*  12/2019  Bates ..................... G06F 16/27
2020/0014816 A1*   1/2020  Speasl ................ H04N 1/00129
2020/0136811 A1*   4/2020  Li ......................... H04L 9/3239

OTHER PUBLICATIONS

"International Application Serial No. PCT/US2020/018581, Written Opinion dated Apr. 20, 2020", 6 pgs.

* cited by examiner

VERIFYING PROVENANCE OF DIGITAL CONTENT

TECHNICAL FIELD

Some embodiments pertain to verifying data authenticity. Authenticity can be verified after editing, transforming, re-encoding, distributing, or the like. Some embodiments pertain to reconstructing an original of the content.

BACKGROUND

A current digital content consumption environment relies almost entirely on a reader trusting that consumed digital content is accurate. The reader can trust that video or other digital content is authentic. The reader can trust that a quote, clip, or other content in the video were used in the context faithful to the original content or not altered in a way as to be misleading. While this approach is appropriate and effective when all the participants in the media ecosystem have benign intent, it is fragile in the face of adversarial action, such as an influence operation by foreign intelligence agencies, intentionally misleading coverage, or even unintentionally false coverage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
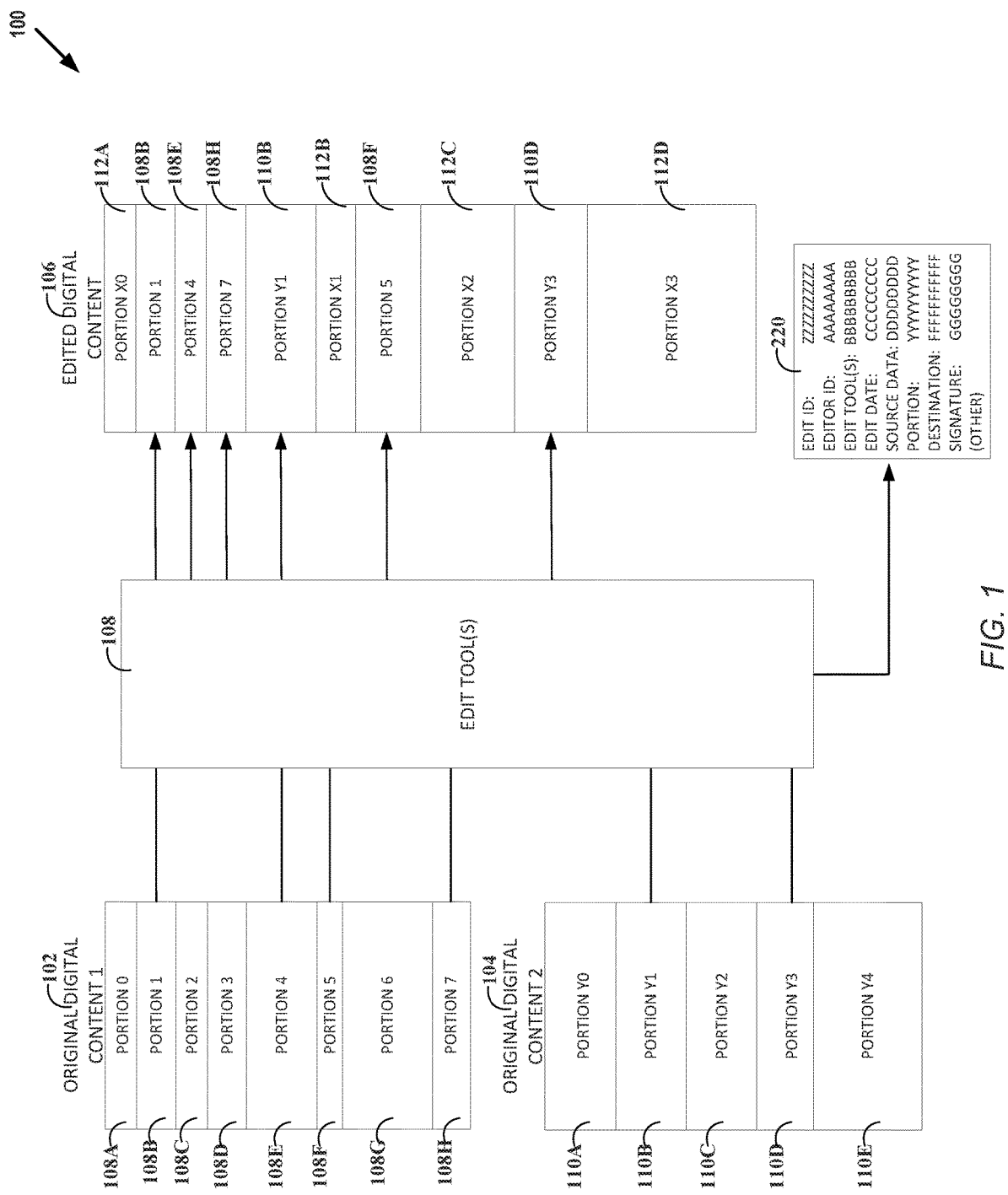
FIG. 1 illustrates, by way of example, a diagram of an embodiment of generating edited digital content.

The present inventors have recognized, among other things, that improvements to verifying the provenance of digital content can be beneficial. If a media outlet or other digital content provider chooses to use a provenance or attestation tracking system, such as is provided by embodiments of the disclosure, the digital content provider can prove to any interested party that the media provided has a "clean" editing history, it accurately represents an event as it took place, and the digital content accurately represents the context in which the event took place. Media companies or other digital content providers that choose to use such a provenance system can assert a higher level of credibility, while a digital content consumer can choose to ignore or give less credence to entities or digital content that is not part of such a system.

Embodiments can provide a means for proving authenticity or reconstructing original digital content, even as it is edited, transformed, re-encoded, distributed, or a combination thereof. Embodiments can provide a mechanism to reconstruct the original digital content. Embodiments can provide a controlled editing environment that can preserve the history of the digital content over time. By providing this kind of traceability for content, an entity, such as a news outlet, celebrity, podcaster, news anchor, or other digital content provider, can attest to the veracity of their publications, prove that a quote was used in context, prevent claims of misuse of video footage, or otherwise provide provenance to their content.

The technology of embodiments can be built into a camera, editing software, a distribution mechanism, or the like. Embodiments can automate a provenance and attestation process. In addition, using techniques such as watermarking, media can carry their own attestation information that can be verified against a distributed ledger.

Given the prevalence of deep fakes, misleading video edits, and "fake news", a social media environment or other digital content consumption vehicle can benefit from a way to prove that a video recording (for example) is authentic (that is, a recording of an event that actually occurred) or represented in the appropriate context (e.g., as a part of a larger speech given on a particular day). By using a distributed ledger, specialized plugins for editing software, or the like, each step of the editing process can be verified and linked back to a source digital content. Each editing stage can be published to a distributed ledger, such as can include a blockchain or a blockchain like structure. The ledger can provide a means for attestation without providing the actual digital content. The ledger can include cryptographic hashes to aid in the attestation. The ledger can be queried so that a digital content consumer can determine the provenance of a particular content item. Given the edit chain of the content item, the provenance of each portion of the digital content item can be discerned.

FIG. 1 illustrates, by way of example, a diagram of an embodiment of generating edited digital content. In the embodiment of FIG. 1, original digital content 102, 104 is divided into portions 108A, 108B, 108C, 108D, 108E, 108F, 108G, and 108H, and 110A, 110B, 110C, 110D, and 110E, respectively and some of the portions 108B, 108E, 108F, 110B, and 110D are used in edited digital content 106.

The original digital content 102, 104 and the edited digital content 106 can include text, an image, video, video clip, link (Uniform Resource Locator (URL) link, content link, hyperlink, or the like), rich text, or the like. The original digital content 102, 104 and edited digital content 106 can be part a blog, book, ebook, white paper, dissertation, news article, image, vlog, advertisement, show, program, or the like.

In general, original digital content 102, 104 can be generated by an entity, such as a user, company, organization, government, or the like. The original digital content 102, 104 is then used, at least partly, in edited digital content 106. The edited digital content 106 can include one or more of the portions 108A-108H, 110A-110E and combine them to form the edited digital content 106. The edited digital content 106 can alter a portion, use the portion in such a manner as to remove context or change the meaning of the portion, re-encode the portion into a different format, use the portion as is, augment or amend the portion, or the like. Thus, the edited digital content 106 can include a misleading or false representation of a portion 108A-108H, 110A-110E of the original digital content 102, 104.

The misleading or false representation can harm the credibility of the author of the edited digital content 112. The misleading or false representation can damage the public understanding of what actually happened in an event, harm the credibility of an entity included in the original content 102, 104, deepen a partisan divide, bias a consumer's opinion of the edited digital content 106, or the like.

Embodiments can help overcome one or more of the issues associated with the misleading or false representations. Embodiments can verify the veracity of the edited digital content 106 such as by providing provenance of the edited digital content. The verification can inform a consumer as to whether to trust the edited digital content 106. The verification can indicate which portions of the edited digital content 106 are un-modified, modified, re-encoded, or the like. The verification can indicate an origin of one or more portions of the edited digital content 106 and a chain of custody from the origin of the portion to the use in the edited digital content 106.

Portions of the edited digital content 106 can have varying pasts. For example, a first portion of the edited digital content 106 can be from video and audio originating from a mobile device filming on-scene of an event. That on-scene portion can be re-encoded and uploaded to social media. That re-encoded portion from social media can then be re-mastered to help reduce background noise in the first portion. The re-mastered version can then be altered, such as by clipping a smaller portion therefrom. That clip can then be used in the edited digital content 106, encoded in another format. However, a consumer of the edited digital content 106 will have a very difficult time discerning the origin of the first portion. With this difficulty of discerning veracity of the first portion, and in combination with the other portions of the edited digital content, it can be impractical for a user to verify the veracity of the edited digital content 106. A ledger 222 of additional data 220 (see FIG. 2) can provide provenance of the edited digital content 106 that can be used to determine the veracity of the edited digital content 106.

Embodiments herein provide an ability to verify the veracity of digital content, such as to help overcome problems of digital content previously discussed. The embodiments can do this, at least in part, using content metadata or other additional data. The additional data can provide a consumer of digital content an ability to trace content they consume back to its origin(s). The additional data can indicate to the consumer an edit chain of the digital content. The edit chain can indicate an identity of a prior editor, an origin of the content the editor worked from, a tool used to perform the editing, a date or range of dates over which the editor made the edits, a location in the content being edited the portion resides, a link to the original content, a signature (or lack thereof) attesting to the content of the additional data, or the like. Using the additional data, the consumer can easily trace the portion(s) of the digital content back to their origin(s) and determine whether there was foul play in the edit chain (e.g., taking content out of context, altering content in a manner to falsify the content, or the like), there might be foul play, or the content is true to the original. This can be indicated by a user unwilling to provide a signature somewhere in the chain or otherwise obscure their identity, a user willing to admit they altered the portion(s) and indicate the same in the chain, or somewhere in between. In some examples, an editor can produce a satire or other piece of digital content in which a user is willing to openly admit that they edited the portion(s) to be untrue to the original. These editors can be conscientious of the threat of using the content for edited serious content creation. These editors can assert a flag associated with the portion(s) to indicate that there can be an issue with the veracity of the content they generated.

Figure 2:
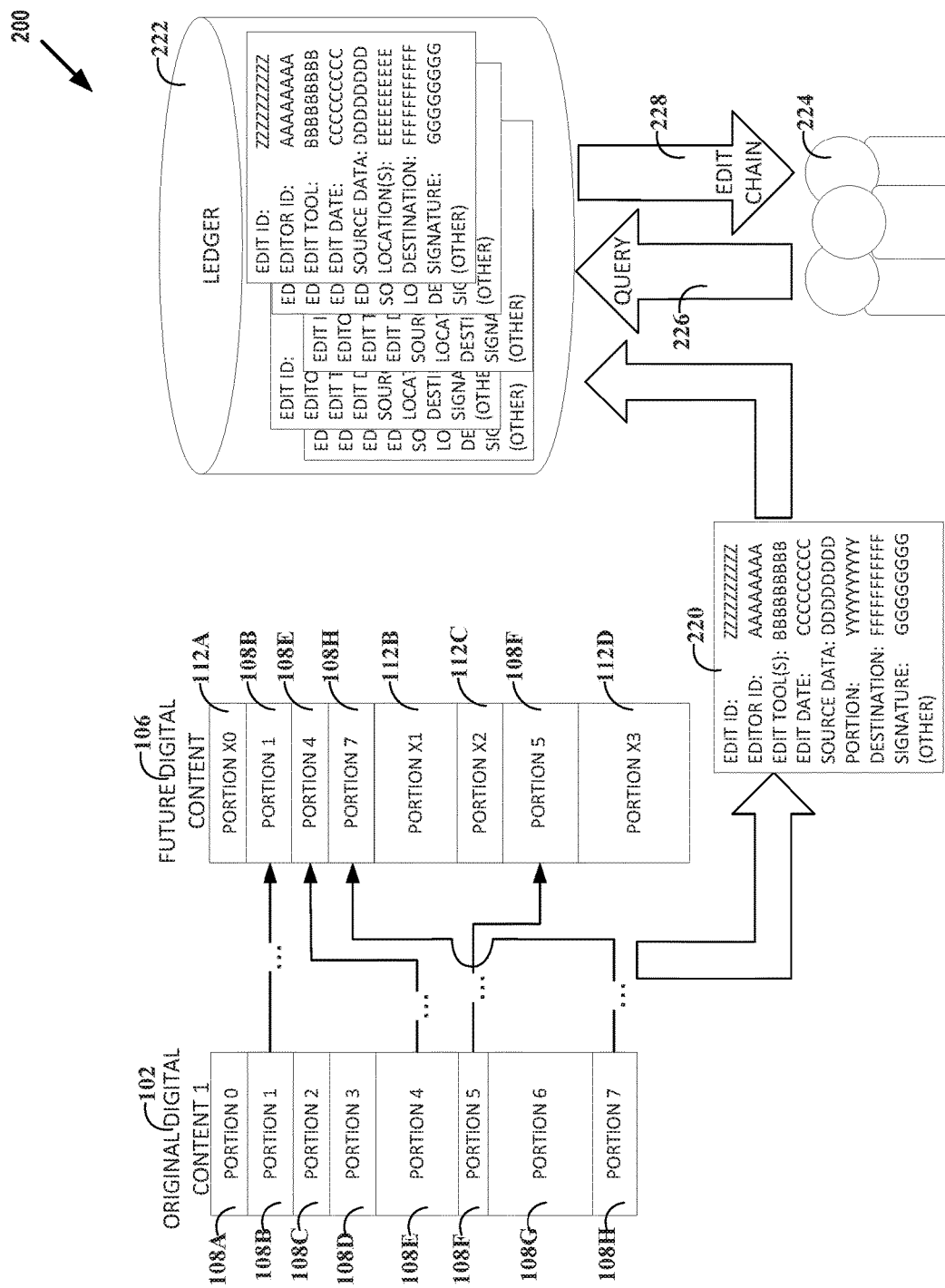
FIG. 2 illustrates, by way of example, a diagram of an embodiment of a system for indicating and verifying a veracity of digital content.

FIG. 2 illustrates, by way of example, a diagram of an embodiment of a system 200 for indicating and verifying a veracity of digital content. The system 200 as illustrated includes original digital content 102, edited digital content 106, additional data 220, a ledger 222, and a consumer 224. In the example of FIG. 2, portions 108B, 108E, 108F, and 108H of the original digital content 102 are used in edited digital content 106. The portions 108B, 108E, 108F, and 108H are not necessarily subject to a same edit history. For example, the portion 108B can have a different edit history than the portion 108F. The portions 108B, 108E, 108F, and 108H can each have their own edit history (sometimes called an edit chain).

The edit history of each portion 108B, 108E, 108F, 112A-112D can be recorded using the additional data 220. The additional data 220 can include an edit identification, an editor identification, edit tool(s) used to perform the edit, edit date(s), source data, which portions of the source data are used in the portion associated with the additional data 220, destination digital content, a signature, a description of the digital content (e.g., entity or character in the digital content, location in the digital media, a satire or fiction flag indicating whether the content is fiction, non-fiction, or the like, etc.), publisher-specific data (e.g., an archive identifier, or some other internal tracking data), a location at which the content was previously published, among other additional data. The edit identification can uniquely identify the additional data 220 associated with a particular edit of a particular portion. The edit identification can include a signed or unsigned integer or float. The editor identification can uniquely indicate a consumer that performed the edit associated with the additional data 220. The editor identification can include a username, email address, phone number, physical address, or the like. The edit tool(s) can indicate a software, hardware, or other tool used to perform the edit associated with the additional data 220. The edit tool(s) can indicate a year, version, or the like of the edit tool(s) used. The edit date(s) can indicate a date, range or dates, a time, or the like at or around which the edits associated with the additional data 220 were made. The source data can indicate an edit identification associated with data form which the portion was edited. The portions can indicate which portions of the source data are used in the portion associated with the additional data 220. The portions can be in terms of paragraphs, time, pages, line numbers, columns, images, tables, a combination thereof, or the like. The destination digital content can uniquely indicate the edited digital content 106. The signature can indicate whether the editor associated with the editor identification is willing to attest to making the edits. The signature can include a value, such as a cryptographic hash value. The cryptographic hash value can be determined based on the edit identification, editor identification, or other additional data, data of the source digital content, or the like. The absence of a signature can indicate that the editor is not willing to attest to the changes made. In some embodiments, the additional data can indicate a type of edit made. Examples of edit types include re-encoding (e.g., an original encoding format and a destination encoding format), clipping (e.g., using only a portion of the original digital content 102, 104), altering audio, video, text, or other content (e.g., by enhancing, filtering, re-mastering, augmenting, amending, zooming in/out, speeding up, slowing down, or the like), quoting, or the like. The additional data 220 can indicate whether the digital content 220 is original or derivative, such as by using a binary flag.

The ledger 222 includes a centralized or distributed memory device. The ledger 222 includes the additional data 220 for various edited digital content 106. The additional data 220 can be linked, such as by edit identification, source data, or destination of the additional data 220. By tracing the additional data from the latest edit identification all the way to original digital content 102 with additional data 220 that indicates the data of the original digital content 102 is original or the authentic version of the original digital content. The data of the ledger 222 can be indexed or stored in an order that allows for efficient query 226 execution. The data of the ledger 222 can be associated with edit identifications in an edit chain back to all original digital content. More details regarding an example edit chain are provided in FIG. 3.

A consumer 224 can issue a query 226 to the ledger 222. The query 226 can be for an edit chain 228 of digital content. The digital content being experienced by the consumer 224 can be original digital content 102, edited digital content 106, or digital content therebetween. The query 226 can indicate digital content that corresponds to a destination of an entry of the additional data 220 in the ledger 220.

Figure 3:
FIG. 3 illustrates, by way of example, a diagram of an embodiment of the edit chain downstream of an original digital content.

FIG. 3 illustrates, by way of example, a diagram of an embodiment of the edit chain 228 downstream of an original digital content. The edit chain 228 as illustrated includes additional data 220A, 220B, 220C, 220D, 220E, 220F, and 220G for digital content downstream from and including original digital content. Original digital content 102 can be identified by: (1) a lack of source data, (2) source data equal to destination data, (3) an original data flag set to a specified value (e.g., "1"), or the like. In FIG. 3, the additional data 220A corresponds to original digital content for lack of source data.

The additional data 220A-220G is linked in a chain by source data and destination data of the additional data 220A-220G. For example, the destination data of the additional data 220A is the source data for the additional data 220D and 220F. By following additional data 228 of the edit chain 228 until reaching additional data associated with original digital content, a complete history of digital content edits can be identified. The corresponding edit chain associated with a specified destination can thus be provided to a consumer 224 that issues a query 226 for an edit chain associated with a specified digital content (a destination). Note that, in the edit chain 228, the destination data of the additional data 220A-220G is unique for each additional data entry.

When an unattested content is introduced into an edit chain, the unattested contest can be treated as new content provided by the entity introducing it. The consume 224 querying the edit chain can decide whether the new content is trustworthy based on the entity who introduced it.

In a first example, assume the consumer 224 issues a query 226 for destination data "VVVVVVVV". The ledger 222 can return additional data associated with edit IDs "BCBCBCBC", "UUUUUUUU", "NNNNNNNN", and "ZZZZZZZZ". This is due to the source data and destination links between additional data 220A-220D.

While the additional data 220A-220G is linked by source data and destination data, other links between additional data 220 can be used. For example, a blockchain can be used for each edit. In this blockchain, a consumer requests an edit to digital content. The edit request can be broadcast to a network of nodes that includes a full copy of the blockchain that validates the transaction. The validated transaction (edit in this case) can be combined with other transactions to create a new block in the ledger 222. The block can then be added to the blockchain in a way that is permanent and unalterable. The ledger 222 can thus be implemented using the distributed network of nodes configured to implement the blockchain.

Figure 4:
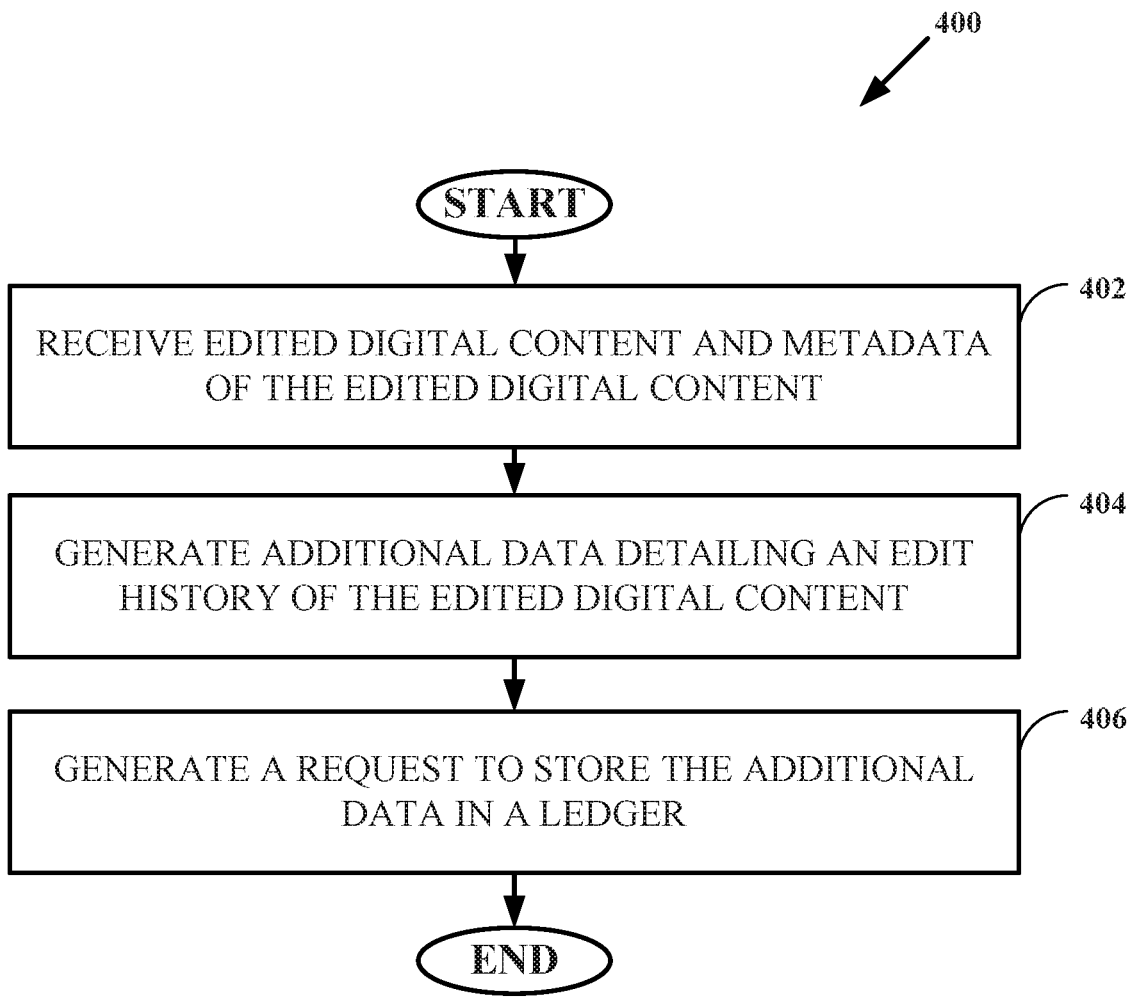
FIG. 4 illustrates, by way of example, a diagram of an embodiment of a method for generating an edit chain for verifying authenticity of digital content.

FIG. 4 illustrates, by way of example, a diagram of an embodiment of a method 400 for generating an edit chain for verifying authenticity of digital content. The method 400 as illustrated includes receiving (at processing circuitry) edited digital content and metadata of the edited digital content, at operation 402; generating (by the processing circuitry) additional data detailing an edit history of the edited digital content, at operation 404; and generating a request store the additional content in a ledger, at operation 406. The metadata can include data indicating one or more of (a) an entity that edited the digital content, (b) source digital content that was altered to generate the edited digital content, and (c) a destination of the edited digital content. The additional data can indicate the entity, an edit identification uniquely identifying the additional data in a ledger, the source digital content, and the destination of the edited digital content. The ledger can be operable to be queried so that a user can determine an authenticity of the edited digital content based on the additional data of an edit chain returned in response to a query.

The method 400 can further include determining (by the processing circuitry) a cryptographic hash value based on the edited digital content. The additional data can include the cryptographic hash value. The method 400 can further include, wherein the ledger includes additional data for an original digital content. The method 400 can further include, wherein the edited digital content includes a portion derived from at least a portion of the original digital content, wherein source digital content of the additional data for the edited digital content identifies the original digital content. The method 400 can further include, wherein the additional data for the edited digital content indicates a location of digital content in the original digital content used in edited digital content.

The method 400 can further include, wherein the additional data for the edited digital content indicates one or more edit tools used to alter the original digital content and generate the edited digital content. The method 400 can further include, wherein the additional data for the edited digital content indicates one or more types of edits made to the original digital content, the one or more types of edits including clipping, quoting, remastering, postprocessing, augmenting, or amending. The method 400 can further include receiving a query indicating destination data identifying the edited digital content and providing, in response to the query, additional data for each digital content in an edit chain of the edited digital content back to original digital content.

The method 400 can further include, wherein the original digital content is identified by (a) a flag indicating that it is original digital content, (b) a source digital content that matches a destination digital content in the same additional data, or (c) a source digital content that is blank or set to a specified value. The method 400 can further include presenting, by a display device, the edited digital content and an identification value that, when queried by a consumer by the ledger, produces an edit chain indicating additional data for each digital content in an edit chain of the edited digital content back to original digital content.

The process of recording additional data for digital content can be performed for multiple "generations" of digital content. A generation in this context means a number of edits removed from an original digital content. For example, in FIG. 3, the additional data 220A corresponds to first generation content, the additional data 220B, 220F corresponds to second generation digital content (content that includes at least a portion of the original digital content edited only once), the additional data 220E, 220C, 220G corresponds to third generation content (content that includes at least a portion of the second generation content), and the additional data 220D corresponds to fourth generation digital content (content that includes at least a portion of the third generation digital content). Thus, a "source digital content" in the additional data can identify a previously edited file. Since the edit chain 228 links the source digital content to the destination digital content and includes all digital content therebetween, and can specify each region of the source digital content and the location in the destination digital content, the chain of custody can be tracked backward to the original source. Given enough edited clips, it can even be possible to reconstruct the original digital content based on the edit chain 228 and without access to the original digital content.

An example concept of operation is provided for illustrative purposed only. Video can be recorded by a videographer. The video can include an embedded watermark. The video data can be signed as authentic by the videographer or other entity. The video data can be delivered to an editing studio. After receiving the video data, the watermark and signature can be verified and the video can be delivered to an editor. The editor can select portions of the video to be used in a news broadcast that. The editing tools used by the editor can generate an edit record, which records the editor, the tool used, the date/time the edit took place, the cryptographic signature of the input media file(s), the portions of those input file(s) that were used, and the mapping from destination media regions back to source media regions. The edit record can be signed with a cryptographic key (or other key) to provide non-repudiation and integrity for the edit record, and also for the source and destination media files.

Data from the edit record can be registered with the ledger 222, either in a public ledger that can be queried by anyone, or a federated ledger that other news media outlets share, or a private ledger for internal auditing. When the video is broadcast, hashes of the broadcast media item can be provided or calculated, and then verified with the distributed ledger by a consumer 224.

When a report is disputed (e.g., the subject of a video says "I never said such a thing—it's a synthetic video!"), the media outlet can use the ledger 222 to prove the provenance of the disputed video clip, demonstrate the context in which the video was recorded, and prove that the video was an authentic representation of an event as it transpired. This transparency helps provide confidence in news reporting and makes it significantly more difficult for malicious actors to inject false or misleading stories into the digital content ecosystem.

Figure 5:
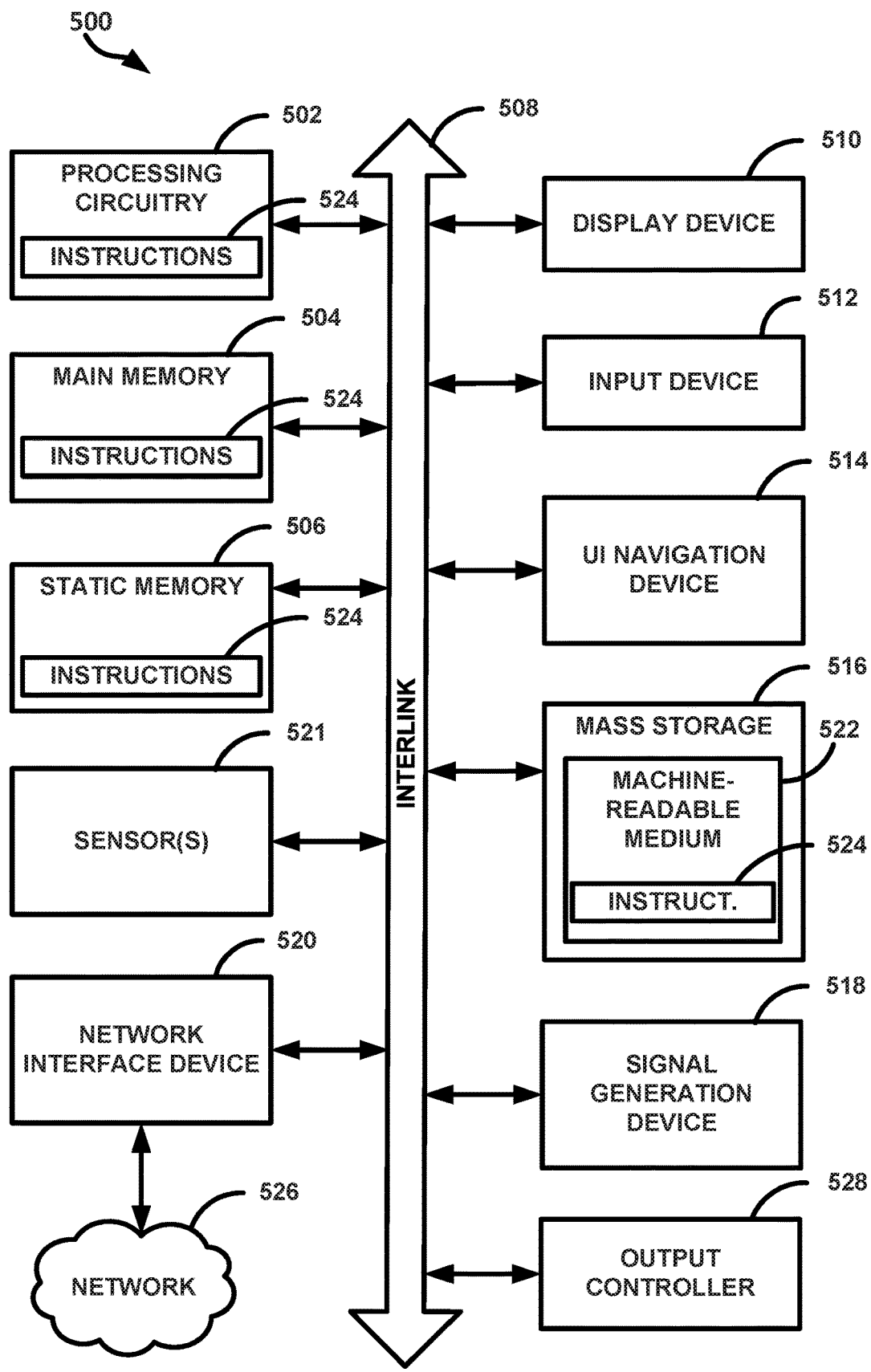
FIG. 5 illustrates a block diagram of an example machine upon which any one or more of the techniques (e.g., methodologies) or operations thereof discussed herein may perform.

FIG. 5 illustrates a block diagram of an example machine 1400 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be, or be a part of, an Autonomous Vehicle, a communications network device, a cloud service, a personal computer (PC), a tablet PC, a personal digital assistant (PDA), a mobile telephone, a smart phone, a camera, digital content editing tool, or any machine capable of executing instructions (sequential or otherwise) that specify actions to be taken by that machine. For example, machine 500 may be or be part of the edit tool(s) 108. The edit tool(s) 108 can include one or more components of the machine 500. In some embodiments, the machine 500 may be configured to implement a portion of the method 400 or other method discussed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part, or all, of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a module at one instance of time and to constitute a different module at a different instance of time.

Machine (e.g., computer system) 500 may include a hardware processing circuitry 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processing circuitry 502 during execution thereof by the machine 500. In an example, one or any combination of the hardware processing circuitry 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Each of these non-limiting examples can stand on its own or can be combined in various permutations or combinations with one or more of the other examples.

Example 1 includes a method comprising receiving, at processing circuitry, edited digital content and data indicating (a) an entity that edited source digital content to generate the edited digital content, (b) the source digital content that was altered to generate the edited digital content, and (c) a destination of the edited digital content, generating, by the processing circuitry, additional data detailing an edit history of the edited digital content, the additional data indicating the entity, an edit identification uniquely identifying an entry in a ledger, the source digital content, and the destination digital content, and generating a request to cause the additional data to be stored in the ledger, the ledger operable to be queried so that a user can determine an authenticity of the edited digital content based on the additional data of an edit chain returned in response to a query.

In Example 2, Example 1 further includes determining, by the processing circuitry, a cryptographic hash value based on the edited digital content and wherein the additional data includes the cryptographic hash value.

In Example 3, at least one of Examples 1-2 further includes, wherein the ledger includes additional data for an original digital content, wherein the edited digital content includes a portion derived from at least a portion of the original digital content, wherein source digital content of the additional data for the edited digital content identifies the original digital content.

In Example 4, Example 3 further includes, wherein the additional data for the edited digital content indicates a location of digital content in the original digital content used in edited digital content.

In Example 5, at least one of Examples 3-4 further includes, wherein the additional data for the edited digital content indicates one or more edit tools used to alter the original digital content and generate the edited digital content.

In Example 6, at least one of Examples 3-5 further includes, wherein the additional data for the edited digital content indicates one or more types of edits made to the original digital content, the one or more types of edits including clipping, quoting, remastering, postprocessing, augmenting, or amending.

In Example 7, at least one of Examples 3-6 further includes receiving a query indicating destination data identifying the edited digital content and providing, in response to the query, additional data for each digital content in an edit chain of the edited digital content back to original digital content.

In Example 8, Example 7 further includes, wherein the original digital content is identified by (a) a flag indicating that it is original digital content, (b) a source digital content that matches a destination digital content in the same additional data, or (c) a source digital content that is blank or set to a specified value.

In Example 9, at least one of Examples 1-8 further includes presenting, by a display device, the edited digital content and an identification value that, when queried by a consumer by the ledger, produces an edit chain indicating additional data for each digital content in an edit chain of the edited digital content back to original digital content.

In Example 10 a system includes processing circuitry to receive edited digital content and data indicating (a) an entity that edited the digital content, (b) source digital content that was altered to generate the edited digital content, and (c) a destination of the edited digital content and generate additional data detailing an edit history of the digital content, the additional data indicating the entity, an edit identification uniquely identifying the edit, the source digital content, and the destination digital content and a ledger operable to be queried so that a user can determine provenance of the digital content based on the additional data of an edit chain returned in response to a query.

In Example 11, Example 10 further includes, wherein the processing circuitry is further to determine a cryptographic hash value based on the edited digital content and wherein the additional data includes the cryptographic hash value.

In Example 12, at least one of Examples 10-11 further includes, wherein the ledger includes additional data for an original digital content, wherein the edited digital content includes a portion derived from at least a portion of the original digital content, wherein source digital content of the additional data for the edited digital content identifies the original digital content.

In Example 13, Example 12 further includes, wherein the additional data for the edited digital content indicates a location of digital content in the original digital content used in edited digital content.

In Example 14, Example 13 further includes, wherein the additional data for the edited digital content indicates one or more edit tools used to alter the original digital content and generate the edited digital content.

In Example 15, at least one of Examples 13-14 further includes, wherein the additional data for the edited digital content indicates one or more types of edits made to the original digital content, the one or more types of edits including clipping, quoting, remastering, postprocessing, augmenting, or amending.

In Example 16, at least one of Examples 13-15 further includes, wherein the ledger is further to receive a query indicating destination data identifying the edited digital content and providing, in response to the query, additional data for each digital content in an edit chain of the edited digital content back to original digital content.

In Example 17, Example 16 further includes, wherein the original digital content is identified by (a) a flag indicating that it is original digital content, (b) a source digital content that matches a destination digital content in the same additional data, or (c) a source digital content that is blank or set to a specified value.

In Example 18, at least one of Examples 10-17 further includes, wherein the operations further comprise causing presentation, by a display device, of the edited digital content and an identification value that, when queried by a consumer of the ledger, produces an edit chain indicating additional data for each digital content in an edit chain of the edited digital content back to original digital content.

Example 19 includes at least one non-transitory machine-readable medium including instructions that, when executed by a machine, cause the machine to perform operations for verifying the provenance of digital content, the operations comprising receiving edited digital content and data indicating (a) an entity that edited the digital content, (b) source digital content that was altered to generate the edited digital content, and (c) a destination of the edited digital content, generating additional data detailing an edit history of digital content, the additional data indicating the entity, an edit identification uniquely identifying the entry in a ledger, the source digital content, and the destination digital content, and generating a request to cause the additional data to be stored in the ledger, the ledger operable to be queried so that a user can determine an authenticity of digital content based on the additional data of an edit chain returned in response to a query.

In Example 20, Example 19 further includes, wherein the operations further include determining a cryptographic hash value based on the edited digital content and wherein the additional data includes the cryptographic hash value.

In Example 21, at least one of Examples 19-20 further includes, wherein the ledger includes additional data for an original digital content, wherein the edited digital content includes a portion derived from at least a portion of the original digital content, wherein source digital content of the additional data for the edited digital content identifies the original digital content.

In Example 22, Example 21 further includes, wherein the additional data for the edited digital content indicates a location of digital content in the original digital content used in edited digital content.

In Example 23, at least one of Examples 21-22 further includes, wherein the additional data for the edited digital content indicates one or more edit tools used to alter the original digital content and generate the edited digital content.

In Example 24, at least one of Examples 21-23 further includes, wherein the additional data for the edited digital content indicates one or more types of edits made to the original digital content, the one or more types of edits including clipping, quoting, remastering, postprocessing, augmenting, or amending.

In Example 25, at least one of Examples 21-24 further includes receiving a query indicating destination data identifying the edited digital content and providing, in response to the query, additional data for each digital content in an edit chain of the edited digital content back to original digital content.

In Example 26, Example 25 further includes, wherein the original digital content is identified by (a) a flag indicating that it is original digital content, (b) a source digital content that matches a destination digital content in the same additional data, or (c) a source digital content that is blank or set to a specified value.

In Example 27, at least one of Examples 19-26 further includes wherein the operations further include causing presentation, by a display device, of the edited digital content and an identification value that, when queried by a consumer of the ledger, produces an edit chain indicating additional data for each digital content in an edit chain of the edited digital content back to original digital content.

The above detailed description includes references to the accompanying drawings, which form a part of the detailed description. The drawings show, by way of illustration, specific embodiments in which some embodiments can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A method for verifying provenance of digital content, the method comprising:
   receiving, at processing circuitry, edited digital content including combined portions of distinct digital content from different respective sources that have been altered multiple times and data indicating, for each alteration of each portion of the combined portions, (a) an entity that edited source digital content to generate the portion of the edited digital content, (b) the source digital content for the portion, (c) a destination of the edited digital content, and (d) a type of edit made to the source digital content;
   generating, by the processing circuitry, additional data detailing an edit history of each portion of the edited digital content, the additional data indicating the entity, an edit identification uniquely identifying the additional data, the source digital content altered to make the portion, and the destination of the portion of the edited digital content;
   generating a request to cause the additional data to be stored in a blockchain ledger, the blockchain ledger operable to be queried so that a user can determine an authenticity of the edited digital content based on the additional data of an edit chain returned in response to a query; and
   receiving a query indicating destination data identifying the edited digital content and providing, in response to the query, additional data for each portion of the edited digital content in the edit chain of the edited digital content back to original digital content of each portion.

2. The method of claim 1, further comprising determining, by the processing circuitry, a cryptographic hash value based on the edited digital content and wherein the additional data includes the cryptographic hash value.

3. The method of claim 1, wherein the blockchain ledger further includes additional data for the original digital content of each portion, and wherein source digital content of the additional data for the edited digital content identifies the original digital content.

4. The method of claim 3, wherein the additional data for the edited digital content indicates a location of the portion of the digital content in the original digital content used in the edited digital content.

5. The method of claim 3, wherein the additional data for the edited digital content indicates one or more edit tools used to alter the original digital content and generate the edited digital content.

6. The method of claim 3, wherein the type of edit including quoting, remastering, or augmenting.

7. The method of claim 1, wherein the original digital content is identified in the additional data by (a) a flag indicating that it is original digital content, or (b) a source digital content that matches a destination digital content in the same additional data.

8. The method of claim 1, further comprising presenting, by a display device, the edited digital content and an identification value that, when queried by a consumer by the blockchain ledger, produces an edit chain indicating additional data for each portion of the edited digital content in an edit chain of the edited digital content back to original digital content.

9. A system comprising:
processing circuitry to:
receive edited digital content including combined portions of distinct digital content from different respective sources that have been altered multiple times and data indicating, for each alteration of each portion of the combined portions, (a) an entity that edited source digital content to generate the portion of the edited digital content, (b) the source digital content for the portion, (c) a destination of the edited digital content, and (d) a type of edit made to the source digital content;
generate additional data detailing an edit history of each portion of the edited digital content, the additional data indicating the entity, an edit identification uniquely identifying the additional data, the source digital content altered to make the portion, and the destination of the portion of the edited digital content;
generate a request to cause the additional data to be stored in a blockchain ledger, the blockchain ledger operable to be queried so that a user can determine an authenticity of the edited digital content based on the additional data of an edit chain returned in response to a query; and
receive results of a query indicating destination data identifying the edited digital content and providing, in response to the query, additional data for each portion of the edited digital content in the edit chain of the edited digital content back to original digital content of each portion.

10. The system of claim 9, wherein the processing circuitry is further to determine a cryptographic hash value based on the edited digital content and wherein the additional data includes the cryptographic hash value.

11. The system of claim 9, wherein the blockchain ledger includes additional data for the original digital content, and wherein source digital content of the additional data for a portion of the edited digital content identifies the original digital content.

12. The system of claim 11, wherein the additional data for the edited digital content indicates a location of digital content in the original digital content used in a portion of the edited digital content.

13. The system of claim 12, wherein the additional data for the edited digital content indicates one or more edit tools used to alter the original digital content and generate the portion of the edited digital content.

14. The system of claim 12, wherein the type of edit includes clipping, quoting, remastering, postprocessing, augmenting, or amending.

15. At least one non-transitory machine-readable medium including instructions that, when executed by a machine, cause the machine to perform operations for verifying the provenance of digital content, the operations comprising:
receiving edited digital content including combined portions of distinct digital content from different respective sources that have been altered multiple times and data indicating, for each alteration of each portion of the combined portions, (a) an entity that edited the digital content, (b) source digital content that was altered to generate the edited digital content, (c) a destination of the edited digital content, and (d) a type of edit made to the source digital content;
generating additional data detailing an edit history of each portion of the edited digital content, the additional data indicating the entity, an edit identification uniquely identifying the entry, the source digital content altered to make the portion, and the destination of the portion of the edited digital content; and
generating a request to cause the additional data to be stored in a blockchain ledger, the blockchain ledger operable to be queried so that a user can determine an authenticity of digital content based on the additional data of an edit chain returned in response to a query; and
receiving a query indicating destination data identifying the edited digital content and providing, in response to the query, additional data for each portion of the edited digital content in the edit chain of the edited digital content back to original digital content of each portion.

16. The at least one non-transitory machine-readable medium of claim 15, wherein the blockchain ledger includes additional data for original digital content of each portion of the edited digital content, wherein source digital content of the additional data for a portion of the edited digital content identifies the original digital content.

17. The at least one non-transitory machine-readable medium of claim 16, wherein the original digital content is identified by (a) a flag indicating that it is original digital content, or (b) a source digital content that matches a destination digital content in the same additional data.

18. The at least one non-transitory machine-readable medium of claim 15, wherein the operations further comprise causing presentation, by a display device, of the edited digital content and an identification value that, when queried by a consumer of the ledger, produces the edit chain indicating additional data for each portion of the edited digital content in the edit chain of the edited digital content back to the original digital content.

* * * * *

UNITED STATES PATENT AND TRADEMARK OFFICE
CERTIFICATE OF CORRECTION

| | |
|---|---|
| PATENT NO. | : 10,880,619 B2 |
| APPLICATION NO. | : 16/281949 |
| DATED | : December 29, 2020 |
| INVENTOR(S) | : Jordan et al. |

Page 1 of 1

It is certified that error appears in the above-identified patent and that said Letters Patent is hereby corrected as shown below:

In the Specification

In Column 3, Line 2, delete "112." and insert --106.-- therefor

In Column 5, Line 24, delete "220." and insert --222.-- therefor

In Column 5, Line 40, delete "228" and insert --220-- therefor

In Column 5, Line 52, delete "consume" and insert --consumer-- therefor

In Column 7, Line 58, delete "1400" and insert --500-- therefor

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*